(12) United States Patent
Jackson et al.

(10) Patent No.: US 7,043,309 B2
(45) Date of Patent: May 9, 2006

(54) DISTRIBUTED ACTUATION ALLOCATION FOR LARGE ASSEMBLIES OF IMPLEMENTATION UNITS

(75) Inventors: Warren B. Jackson, San Francisco, CA (US); Markus P. J. Fromherz, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 1194 days.

(21) Appl. No.: 09/827,169

(22) Filed: Apr. 6, 2001

(65) Prior Publication Data
US 2003/0002447 A1 Jan. 2, 2003

(51) Int. Cl.
*G05B 11/01* (2006.01)

(52) U.S. Cl. .......................... 700/19; 700/99; 700/100; 700/28; 700/95; 700/246; 700/247; 700/250; 706/46; 706/53

(58) Field of Classification Search .................. 700/99, 700/19, 100, 28, 95, 32, 246, 33, 247, 89, 700/250, 245; 271/97, 144, 184, 194, 195, 271/225, 226; 251/129.01; 706/46, 53
See application file for complete search history.

(56) References Cited

U.S. PATENT DOCUMENTS

| | | | |
|---|---|---|---|
| 5,299,287 A * | 3/1994 | Tsuruta et al. ................ 706/46 |
| 5,392,382 A * | 2/1995 | Schoppers .................... 706/62 |
| 5,634,636 A * | 6/1997 | Jackson et al. ............. 271/225 |
| 5,979,892 A | 11/1999 | Smith |
| 6,027,112 A * | 2/2000 | Guenther et al. ........... 271/194 |
| 6,035,277 A * | 3/2000 | Anbil et al. .................... 705/8 |
| 6,039,316 A * | 3/2000 | Jackson et al. ............. 271/194 |
| 6,119,052 A * | 9/2000 | Guenther et al. ........... 700/228 |
| 6,175,775 B1 | 1/2001 | Grunder |
| 6,278,908 B1 * | 8/2001 | Durham ....................... 700/262 |
| 6,409,434 B1 * | 6/2002 | Winther ........................ 406/15 |

FOREIGN PATENT DOCUMENTS

DE 199 37 156 A1 1/2001

OTHER PUBLICATIONS

Biegelsen et al., Characterization of Shear Stress Field Induced By Obliquely Impinging Airjets; Microelectromechnical Systems (MEMS), vol. 1, 1999, pp. 385-389.
Berlin et al., Paper Transport Using Modulated Airjet Arrays; IS&T NIP15: 1999 International Conference on Digital Printing Technologies; pp. 285-288.
Biegelsen et al.; AirJet Paper Mover: An Example of Meso-Scale MEMS; SPIE Michromachined Devices and Components VI; Santa Clara, CA; vol. 4176, Sep. 2000; pp. 122-129.

(Continued)

*Primary Examiner*—Anthony Knight
*Assistant Examiner*—Thomas Pham
(74) *Attorney, Agent, or Firm*—Oliff & Berridge, PLC

(57) ABSTRACT

Apparatus and methods that approximately solve an actuation allocation problem by breaking the solution into modules, which may or may not be overlapping. The solution to the actuation allocation problem is expressed in terms of solutions for each of the modules. The solutions for the modules serve as constraints for a solution of the optimization problem on each module. The optimization problem for each module is decomposed into further modules until the modules consist of a small enough number of individual implementation units so that the solution for the module can be solved using conventional optimization techniques.

17 Claims, 8 Drawing Sheets

OTHER PUBLICATIONS

Walsh et al.; Multilevel Decomposition Approach To Integrated Aerodynamic/Dynamic/Structural Optimization of Helicopter Rotor Blades; AHS Aeromechanics Specialists Conference; San Francisco, CA; Jan. 1994; pp. 1-24.

Wright; The Interior-Point Revolution in Constrained Optimization; Computing Sciences Research Center—Technical Report Apr. 9, 1998; Murray Hill, NJ; Jun. 1998.

Fletcher et al.; Numerical Experience With Lower Bounds For MIQP Branch-and-Bound; University of Dundee; Oct. 1995; pp. 1-4.

Chirikjian et al.; Kinematically Optimal Hyper-Redundant Manipulator Configurations; IEEE Transactions On Robotics and Automation; vol. 11, No. 6; Dec. 1995; pp. 794-806.

* cited by examiner

DISTRIBUTED ACTUATION ALLOCATION FOR LARGE ASSEMBLIES OF IMPLEMENTATION UNITS

BACKGROUND OF THE INVENTION

1. Field of Invention

This invention is directed to apparatus and methods of actuation allocation of a group of implementation units.

2. Description of Related Art

Smart matter systems are systems with a large number of elements such as sensors, actuators, and/or allocators. A major problem for such systems is to coordinate the actions of many elements in order to obtain a desired result or goal for the entire smart matter system. The desired result is achieved by controlling or allocating a particular action to each individual actuator to obtain a cumulative actuation over all the actuators. The desired individual actuation of each actuator can be achieved in a number of ways. However, the actuation must be accomplished in some optimal or near-optimal way while satisfying a number of constraints.

For systems having a relatively small number of actuators, it is relatively easy to determine the desired individual actuation to obtain an overall system actuation, e.g., using an exhaustive search method. Unfortunately, the number of ways to produce a desired collective result increases exponentially with the number of actuators to be controlled. Thus, the problem of allocating actuation among a number of actuators becomes considerably more difficult as the number of actuators increases in the smart matter regime. Moreover, as the number of actuators increases, the time available to compute the allocation often decreases because of the need to communicate the allocation decision to the increased number of actuators.

A related art method of allocating actuators involves an exhaustive search technique, whereby a systematic search is conducted through all possible actuation allocations that are able to accomplish the desired result.

Another related art method of allocating actuation involves solving a mixed integer nonlinear programming problem. The allocation problem is cast as a mixed integer nonlinear programming problem over a set of continuous and integer variables to select the actuation for each actuator. Various methods, such as branch-and-bound, Bender's decomposition, and outer approximations are used to solve mixed integer nonlinear programming problems. These methods solve the optimization problem without integer constraints and then incrementally enforce the integer constraints. The result is that, rather than computing all of the exponential number of combinations that are possible, only promising branches of the search tree are computed with the expense of solving a nonlinear optimization problem at each node of the tree.

Other related art methods to solve the constrained optimization for the actuator allocation use standard optimization methods such as interior point or active set methods.

However, these related art methods have numerous disadvantages and shortfalls.

SUMMARY OF THE INVENTION

The related art method of allocating actuation through an exhaustive search technique may operate within certain acceptable parameters for smart matter systems that require control of only a relatively small number of actuators, because all of the possible solutions can be computed in a relatively short period of time. However, the computational effort for exhaustive search grows exponentially with the number of actuators and the number of actuator states, and is therefore not feasible if the number of actuators increases beyond a certain limit, which is typically less than 10 depending on the processor speed and control bandwidth desired.

The related art method of using mixed integer nonlinear programming to allocate actuators also has disadvantages. The computations at each branch are more complex because they involve the solution of a constrained nonlinear programming problem at each step. Moreover, the algorithms for this method require full knowledge of the system in a central location, and the allocations are difficult to distribute among a number of processors. Thus, for methods employing nonlinear programming techniques, if the hardware of a system is modular in nature, extensive communication is required to provide the central allocator with the required information.

The related art methods of allocating actuators using standard optimization techniques also have disadvantages. These types of methods require solutions that result in large deviations from optimality, because the solutions are restricted to binary values and numbers of actuators less than 100. These techniques also require universal knowledge about the system and therefore make heavy use of communications, which constitutes a large cost in distributed systems.

As a result of the shortcomings of the above related art methods, new methods and apparatus for allocating actuation are needed for smart matter systems.

The present invention provides methods and apparatus that hierarchically decompose an actuation allocation and balance the need for rapid computation against optimality.

The present invention separately provides methods and apparatus that are able to allocate actuation for systems having differing numbers of implementation units, ranging from a few implementation units (e.g., 10) to a large number of implementation units (greater than 10000).

The present invention separately provides methods and apparatus for allocating control of implementation units that minimize the need for communication with a system controller.

The present invention separately provides methods and apparatus that use continuous high level solutions to break an actuator allocation problem into smaller problems that can be solved in an optimal way or by breaking the smaller allocation problem down into yet smaller problems.

The present invention separately provides methods and apparatus that decompose a plurality of actuators into groups of actuators and further deocompose the groups into smaller groups, such as modules and submodules, until the groups include a number of actuators that a local optimal search can be performed, wherein the positions of the actuators do not have to be known for the decomposition of the actuators and the details of a submodule are not required to be known by the module that includes the submodule.

The present invention separately provides methods and apparatus that decomposes a plurality of actuators into groups of actuators wherein the grouping of actuators can be an arbitrary grouping.

The present invention separately provides methods and apparatus wherein the time to compute the near optimal actuator allocation scales with the number of actuators.

The present invention separately provides methods and apparatus for allocating actuation that are hierarchical in nature so the computation of the allocation of the actuators is adaptable to the structure of the smart matter system and the smart matter communication system.

The present invention separately provides methods and apparatus for actuator allocation that are suitable for tiled actuation.

The present invention separately provides methods for actuator allocation that are capable of being implemented by multiprocessors.

These and other features and advantages of this invention are described in or are apparent from the following detailed description of various exemplary embodiments of the apparatus and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF PREFERRED EMBODIMENTS

There are many types of many element systems that include implementation units, wherein an overall goal of the entire system is desired, but because of the aforementioned problems, it is difficult to allocate instructions to the implementation units to obtain that overall goal. The present invention provides for allocating that overall goal to groups of implementation units, i.e. subdomains or implementation modules, as well as individual implementation units. Thus, according to the present invention, an array of implementation units is divided into subdomains where the desired goal is provided to the subdomains. Also, in accordance with the present invention, the subdomains can also be divided into further subdomains and the process can be continued until the last subdomains have a sufficiently small number of implementation units to perform a local optimal search. The subdomains do not have to align exactly with any particular implementation unit, but rather they can represent an arbitrary grouping of implementation units. Further, the positions or arrangements of the implementation units do not have to be known for decomposition of the overall goal and the details of the lower level subdomains can be hidden from upper level subdomains.

Figure 1:
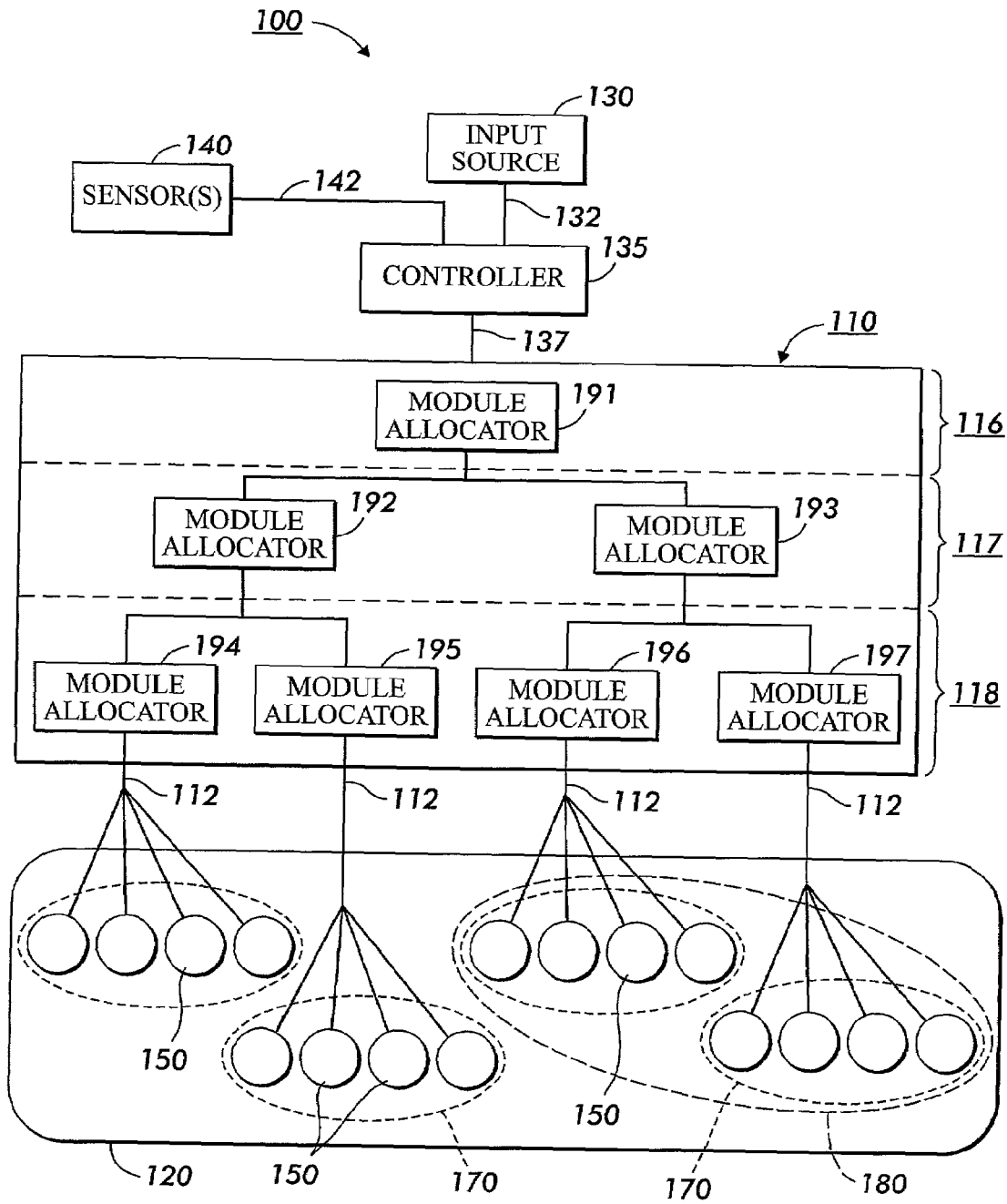
FIG. 1 is a schematic of an exemplary embodiment of a many element system according to this invention.

FIG. 1 is a schematic that shows one exemplary embodiment of a many element system 100 having a distributed actuation allocation, according to this invention. The system 100 can be any type of system that is used in any number of different types of applications, such as but not limited to an air jet paper transport systems, robotic systems and the like. System 100 includes a system allocator 110, a plurality of implementation units 120, an input device 130, a controller 135 and at least one sensor 140.

The plurality of implementation units 120 includes individual implementation units 150. The implementation units 150, under the control of the allocator 110, operate to create a desired result or action. In various exemplary embodiments, the plurality of implementation units 120 are an array of implementation units. In various exemplary embodiments, the implementation units 150 are actuators. In other various exemplary embodiments, the implementation units 150 are air jets that act upon a piece of paper to move the paper from one position to another.

The input device 130 communicates with the controller 135 along communication link 132. The input device 130 provides the controller 135 with an overall objective. In various exemplary embodiments the input device 130 is a computer or a software program configured to generate the overall objective for the system 100. In other various exemplary embodiments the input source 130 is, but is not limited to, a joystick, mouse, or other graphical input source read by a computer where the objective for the system 100 is related to the output of the graphical input source. In other various exemplary embodiments, the input source 130 is a higher-level control element or elements of a system that includes system 100. An example of a higher-level control element is a job scheduler of a printing system which sends paper motion goals (desired trajectories) to a paper handler (an example of a system 100).

It should be appreciated that in various exemplary embodiments, the overall objective can be, but is not limited to, a trajectory of an object or in other various exemplary embodiments, a desired state of the implementation units.

The at least one sensor 140 communicates with the controller 135 along a communications link 142. The at least one sensor 140 monitors or detects the current status of the actuation of the plurality of implementation units 150 and provides the status information to the controller 135 along communications link 142. In other various exemplary embodiments, the at least one sensor 140 detects the status of an object upon which the plurality of implementation units 150 act.

The controller 135 receives the overall objective from the input source 130. The controller 135 computes a system goal, based on the overall objective. In various exemplary embodiments that include at least one sensor 140, the controller 135 receives the current status information from the at least one sensor 140 and computes instructions, based on the overall objective and the current status information. In various exemplary embodiments, the controller 135 is a proportional derivative controller. It should be appreciated that any known or later developed controller may be used as controller 135.

In various exemplary embodiments the system goal is a force allocation, instruction or goal for the implementation units 150 to achieve. In various exemplary embodiments, the system goal is a continuous value. In other various exemplary embodiments, the system goal is a discrete value.

The allocator 110 receives the instructions from the controller 135. The allocator 110 implements an allocation algorithm to determine which implementation units should be actuated in order to achieve the overall objective for the system 100. The allocator 110 communicates with the plurality of implementation units 120 along at least one communication link 112.

In various exemplary embodiments, the plurality of implementation units 120 are divided into groups of implementation units. The groups of implementation units can be further divided until the number of implementation units in the groups is sufficiently small enough to allow the allocator 110 to perform a local optimal allocation search.

The plurality of implementation units are divided into a plurality of implementation unit modules 170 and 180. In various exemplary embodiments the implementation unit modules 170 include individual implementation units 150. In various exemplary embodiments the implementation unit modules 180 include at least one other implementation unit module 170 as a submodule. In various exemplary embodiments, more than one of the implementation unit modules 170 include the same individual implementation unit 150, (this arrangement is not shown in FIG. 1). In various exemplary embodiments, more than the implementation unit module 180 includes the same implementation unit module 170 (this arrangement is not shown in FIG. 1). It is understood that the plurality of implementation units 150 may be further divided and grouped in many varying arrangements.

In various exemplary embodiments, the allocator 110 allocates the overall objective to the plurality of implementation units 120 by expressing the overall objective in terms of solutions, module allocation, sub-goals, sub-objectives or sub-instructions for each of the modules 170 and 180. The solutions for each of the modules 170 and 180 serve as constraints for a solution for the overall objective allocation. The solution for each module 170 may in turn be decomposed into further subsolutions for submodules, thus providing hierarchical decomposition. The hierarchical decomposition can be continued by the allocator 110 until the submodules include a sufficiently small enough number of individual implementation units 150 so that the allocation solution for that submodule can be performed quickly using a conventional technique, such as but not limited to an exhaustive search technique.

In various exemplary embodiments, the allocator 110 includes a plurality of allocation levels. In an exemplary embodiment, shown in FIG. 1, the allocator 110 has a top level 116, a middle level 117 and a bottom level 118. In various exemplary embodiments, the allocator 110 includes as few as one allocation level to as many allocation levels as necessary to communicate to all implementation units such that the allocation can be performed within desired time constraints.

The top level 116 includes a module allocator 191. The middle level 117 includes module allocators 192 and 193. The bottom allocation level 118 includes module allocators 194, 195, 196 and 197. The allocation levels 116, 117 and 118 are arranged in a hierarchical arrangement, whereby the module allocator 191 in the top level 116 controls the module allocators 192 and 193 of the middle level 117. The module allocator 192 of the middle allocator level 117 controls the module allocators 194 and 195 in the bottom allocation level. The module allocator 193 of the middle allocation level 117 controls the module allocators 196 and 197 of the bottom allocation level 118. The module allocators 194, 195, 196 and 197 of the bottom level 118 control respective groups of implementation units 170 or individual implementation units 150.

It should be appreciated that the controller 135 and actuator 110 shown in FIG. 1 can be implemented as portions of a suitable system, manager or programmed general purpose computer. Alternatively, the controller 135 and actuator 110 can be implemented using an ASIC, a FPGA, a PEDL, a PLA, or a PAL, or using physically distinct hardware circuits, such as discrete logic elements or discrete circuit elements. The particular form the controller 135 and actuator 110 shown in FIG. 1 will take is a design choice.

The links 112, 132, 137 and 142 can each be any known or later developed device or system for connecting the array of implementation units 120, the goal generation device 130, and the at least one sensor 140, respectively, to the allocator 110, including a wire, a direct cable connection, a connection over a wide area network or a local area network, a connection over an intranet, a wireless connection, a connection over the Internet, or a connection over any other distributed processing network or system. In general, the links 112, 132, 137 and 142 can be any known or later developed communication system or structure usable to connect the respective devices.

It should be appreciated that the plurality of implementation units 120, the input device 130, the controller 135 and the allocator 110 do not have to be physically located together. Furthermore, it should be appreciated that the allocator 110 and the controller 135 can be integrated into a single device. It should also be appreciated that the input source 130, the controller 135 and the allocator 110 can be integrated into a single device.

Figure 2:
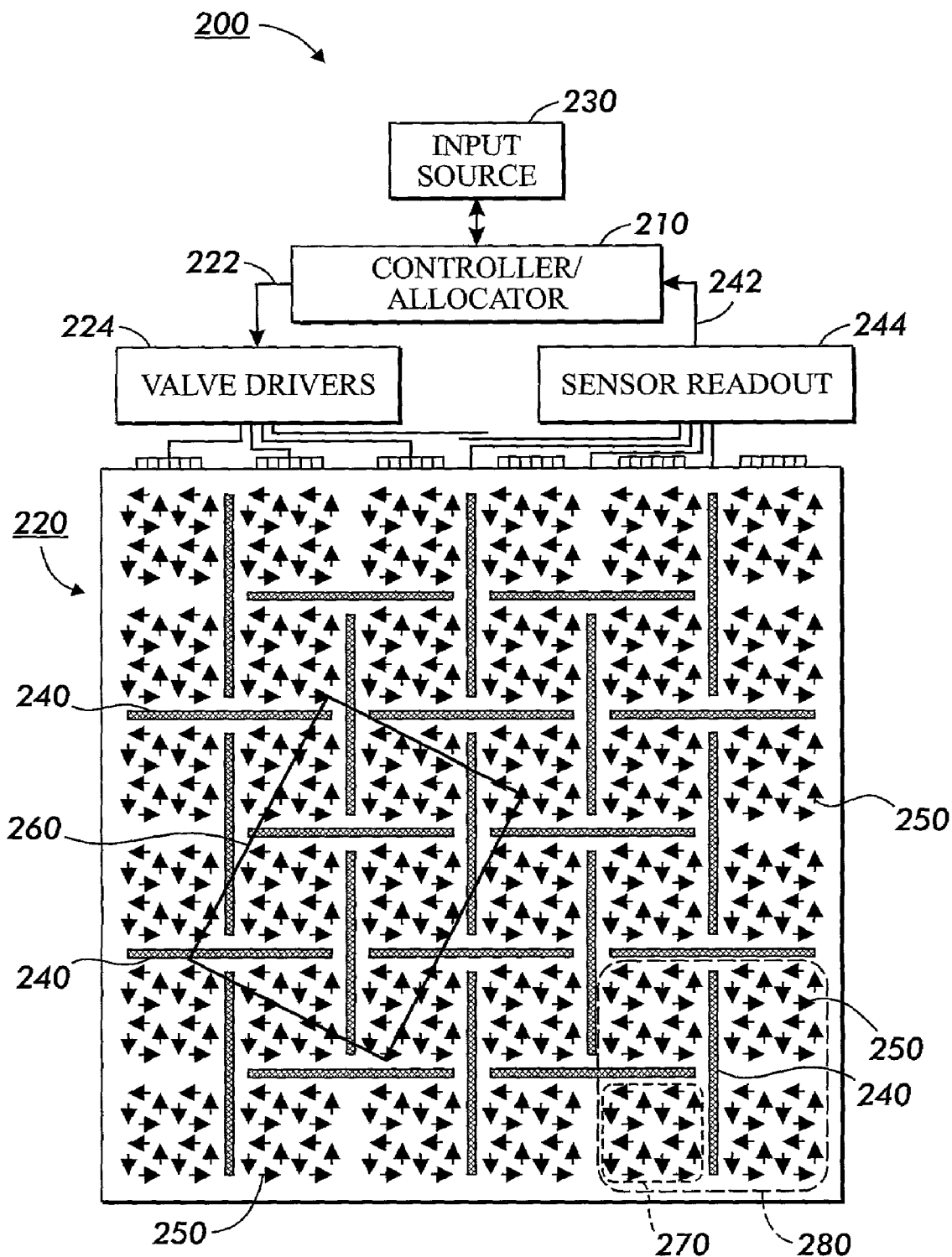
FIG. 2 is a schematic of an exemplary embodiment of an air jet paper transport system, according to this invention.

FIG. 2 shows an air jet paper transport system 200, which is one exemplary embodiment of a many implementation unit system 100. The system 200 includes a controller/allocator 210, which is an exemplary embodiment of a device that includes a controller integrated with an allocator. In various exemplary embodiments the controller/allocator 210 includes hierarchical allocation levels similar to the allocator 110.

The system 200 also includes an array of air jets 220 and a input source 230, and a plurality of sensors 240. These devices are exemplary embodiments of the array 120, the input device 130 and the at least one sensors 140, respectively.

Further, the controller/allocator 210 is in communication with the input source 230 via communication link 232, the sensors 240 via communication link 242 and the air jets via communication link 222. Links 222, 232 and 242 are exemplary embodiments of links 122, 132 and 142.

Disposed along link 222 is at least one valve driver device 224, which controls the opening and closing of the individual air jet valves 250 based on instructions received from the allocator via link 222. The at least one valve driver device 224 may be any known or later developed valve driver device.

Disposed along link 242 is at least one sensor readout 242, which receives signals from the sensors 240 via conventional techniques and/or devices, and provides the sensor signals to the controller 210 via link 242. The sensor read out 242 may be any known or later developed device.

An object 260 is disposed over the array of air jets 250. In this exemplary embodiment, the object 260 is a piece of paper. The air jets 250 will, under the control of the controller/allocator 210, move the object 260 to a particular position or orientate the object 260 in a particular orientation.

The sensors 240 are dispersed throughout the array 220. In various exemplary embodiments, the sensors 240 are CMOS image sensor bars located throughout the actuation surface. The sensors are wired to detect edge positions of the object 260. The spacing of the sensors 240 is such that, for typically sheet sizes of paper, there are always at least four points where a paper edge intersects the sensors 240. Thus, the x, y, and angular positions of the object 260 can be determined as the object 200 moves over the array 220. In various exemplary embodiments, read-outs of the sensors 240 and position calculation take well less than 1 ms.

In various exemplary embodiments, the array of air jets 220 includes 576 angled air jets. The angled air jets are oriented in one of four different directions (left, right, up, and down) and distributed equally in the array 220. In this exemplary embodiment, the array of air jets 220 may be thought of as consisting of 36 (or 6×6) "tiles"/actuator modules 270 of air jets. In various exemplary embodiments, each tile/actuator module 270 includes sixteen (or 4×4) air jets. The actuator modules 270 can be grouped together to form larger actuation modules 280. In embodiments that include the large actuator modules 280, the actuator modules 270 can be thought of as submodule actuators of the larger module actuator 280. In accordance with the present invention, it should be appreciated that the larger actuator modules 280 could be grouped together to form even larger actuator modules and that the actuator modules 270 could be further decomposed into further actuation submodules.

In various exemplary embodiments, individually computer-addressable electrostatic flap valves control the flow of air through each air jet 250. Note, the source of the air is not shown. The air from a jet impinges on the object 260. In an exemplary embodiment, wherein the object 160 is a sheet of paper, the air coming from the air jets 250 makes the paper float above the array 220. In various exemplary embodiments, the paper floats roughly 2 mm above the exit of the air-jets 250. Due to the viscous drag of the air against the paper, a force is applied to the paper largely confined in a small circular region around the impact point of the air on the paper. Forces on the order of $10^{-4}$ Nt per jet for supply pressures of 1 kPa are typical. See Biegelsen, David K; Panides, Elias; Swartz, Lars E; Jackson, Warren B; Berlin, Andrew A. Characterization of Shear Stress Field Induced By Obliquely Impinging Air Jets, MEMS-Vol. 1, Microelectromechanical Systems (MEMS) (ASME 1999), pp. 385–389, which is incorporated herein by reference.

The forces of each air jet 250 add together as a linear superposition. Because the valves of each air jet 250 are either open or closed, each air jet 250 is essentially a binary force actuator. The entire array 220 can be viewed as a distributed array of binary force actuators. In various exemplary embodiments, the response time of an air jet 250, namely the time it takes for an air jet 250 to respond to a command, depends on the voltage applied to the flap valve of the air jet 250, as well as the air supply pressure. In various exemplary embodiments, the response time of an air jet 250 is typically on the order of 1–2 ms.

The state of object 260 can be described by six values. Particularly, the object 260 can have an x position, a y position, an angular position, a velocity in the x direction, a velocity in the y direction and an angular velocity about an axis (z-axis) perpendicular to the plane of the air jets.

The controller/allocator 210 must choose from these multiple air jets 250 to apply the necessary forces to move the object 260 toward a desired overall objective. This arrangement illustrates that the problem of force allocation to actuators is an instance of the general problem of allocating a desired macro-level actuation to the micro-level actuators of a highly distributed system. In this exemplary embodiment, the actuators are binary air jets, which creates an integer programming problem. The controller/allocator 210 employs allocation methods, according to this invention, that solves these problems.

As the object 260 moves across the array 220, the positions of sheet edges are sensed by the sensors 240. These sensor readings are used by the controller/allocator 210 to compute the x, y, and angular positions of the object 260. This position information over time is used to also compute the x, y and angular velocities of the object 260. The positions and velocities of the object 260, are the object state. The controller/allocator 210 computes the object state and compares it to a desired state given by a predetermined or dynamic trajectory, which is originally based on the overall objective from the input source 230.

In various exemplary embodiments, the controller/allocator 210 includes a plurality of allocation levels, each having at least one module allocator, not shown in FIG. 2, which are arranged in a hierarchical manner. The plurality of module allocators are used to compute the desired x and y forces and a torque about the z-axis (perpendicular to the object 260) for each larger module actuator 280 and for each module actuator 270, submodule. These forces are then allocated to the individual air jets 250 that together apply the desired actuation forces to the object 260. In various exemplary embodiments, this control cycle is executed once every millisecond. It should be appreciated, that in other various exemplary embodiments, the controller/allocator 210 may include additional and/or separate allocation devices having module allocators to assist in allocating the overall objective.

Exemplary paper transport systems are disclosed in the following: (1) Berlin, Andrew; Biegelsen, David; Cheung, Patrick; Fromherz, Markus; Goldberg, David; Jackson, Warren; Panides, Elias; Preas, Bryan; Reich, James; and Swartz, Lars, "Paper Transport Using Modulated Airjet Arrays," IS&Ts NIP 15:1999 International Conference on Digital Printing Technologies, Orlando, Fla., October, 1999, pp. 285–288; and (2) Biegelsen, David; Berlin, Andrew; Cheung, Patrick; Fromherz, Markus; Goldberg, David; Jackson, Warren; Preas, Bryan; Reich, James; and Swartz, Lars, "AirJet Paper Mover: An Example of Meso-Scale MEMS," SPIE, Micromachined Devices and Components VI, Santa Clara, Calif. Vol 4176, September, 2000, pp. 122–129.

Figure 3:
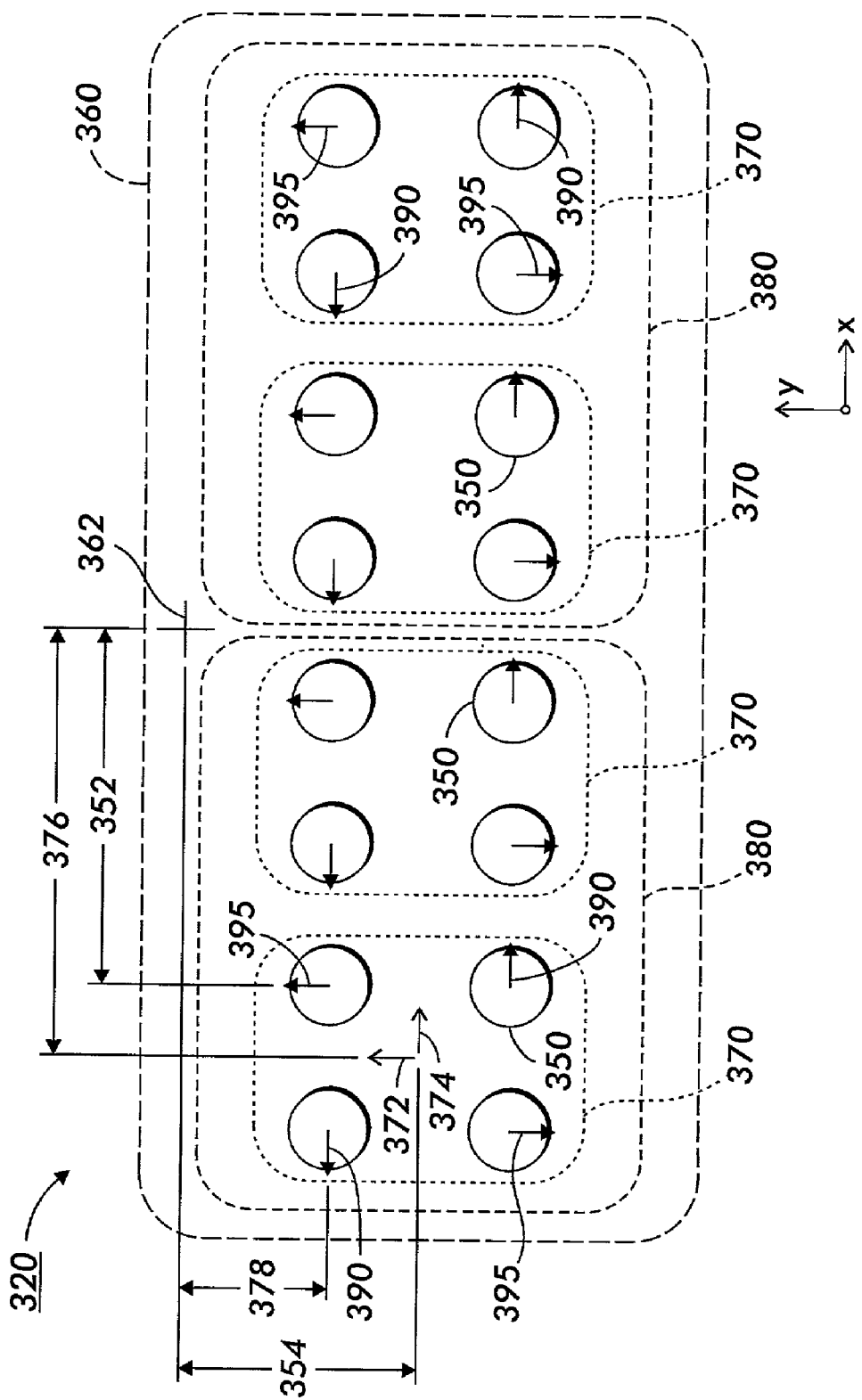
FIG. 3 is a schematic of an exemplary embodiment of an array of actuators, according to this invention.

FIG. 3 shows one exemplary embodiment of an array of air jets 320, which is an exemplary embodiment of the array of actuators 120.

The array 320 includes a plurality of air jets 350. The array 320 has been modeled as a set of N jets on a 2-d grid. An air jet i (i in 1, . . . , N) is represented by its:
position $(x_{xi}, y_{xi})$;
force domains $d_{xi}$ and $d_{yi}$; and
forces $f_{xi}$ and $f_{yi}$ ($f_{xi} \epsilon d_{xi}, f_{yi} \epsilon d_{yi}$).

The position ($x_i$ identified as 352, $y_i$ identified as 354) is given relative to the center of mass 362 of an object 360. In various exemplary embodiments, the center of mass 362 is approximated. However, in other various exemplary embodiments, the center of mass 362 is provided to the controller or the system is calibrated to learn the center of mass 362. In various exemplary embodiments, only the actuators under the object 360 at the time of interest are modeled.

A force domain of an individual air jet 350 may be a continuous interval $d_i=[f_{min},f_{max}]$ or a discrete set of possible values $d_i=\{f_{min}, f_{min}+f_{inc}, f_{min}+2f_{inc}, \ldots, f_{max}\}$ for some increment value $f_{inc}$. In various exemplary embodiments, an air jet 350 can only apply an x-force 390 or a y-force 395 in either a positive or a negative direction. In various exemplary embodiments, the air jet 350 can only be on or off because of a binary valve that controls the air flow through the air jet 350. Thus, for an x directional air-jet, the force domain is $$d_{xi} = \begin{cases} \{0, f_{max}\} & (\text{positive } x-\text{jet}) \\ \{-f_{max}, 0\} & (\text{negative } x-\text{jet}) \end{cases} \quad \text{Eq. (1)}$$

$$d_{yi} = \emptyset$$

The equivalent holds for y-directional air-jets. In various exemplary, embodiments, the time for a jet valve to switch states is generally on the order of the control cycle, namely 1–2 milliseconds, and thus negligible relative to the motion of the object 360. Thus, it is assumed for the following discussion purposes that the jet valves can switch states (open and closed) instantaneously.

In various exemplary embodiments, the air jets 350 may be grouped together to form tiles. It should be understood that each actuator module 370 may contain any number of individual air jets 350. The air jet module 370 may contain both x-directional and y-directional air jets, and thus have both an x-force component 372 and a y-force component 374. For example, the maximum force for a module air jet 370 with n x-jets and n y-jets, with equal numbers of jets in positive and negative directions, is $f_{MAX}=n/2\ f_{max}$ in either direction. Thus, the domains for such a module air-jet 370 are:

$$d_{xi}=d_{yi}=\{-f_{MAX}, -f_{MAX}+f_{max}, \ldots, 0, \ldots, f_{MAX}\} \quad \text{Eq. (2)}$$

The actuator module 370 has a position ($x_{xi}$ identified as 376, $y_{xi}$ identified as 378) that may be given as the centroid of the bounding box or the average position of air jets 350 within its bounds.

In various exemplary embodiments, an air jet module includes a group of actuator modules 370, rather than individual actuators 350. An example of such an air jet module is identified as 380. The air jet module 380 is similar to the air jet module 370 in that it can have both x and y force components, a position, and a force domain.

Together, the air jets 350 in an air jet module 370 or the entire system or array of actuators 320 deliver an x-force $F_x$, a y-force $F_y$, and a z-torque $T_z$ to the object 360.

In various exemplary embodiments, an actuator module i contributes additively with forces $f_{xi}$ and $f_{yi}$ to the system's x and y-forces, respectively. Furthermore, the force $f_{xi}$ contributes with $-y_i\ f_{xi}$ to the z-torque (about the center of mass 362 of the object 360), and the force $f_{yi}$ contributes with $x_i\ f_{yi}$. In other words, the z-torque delivered by the actuator module i is $t_{zi}=x_i\ f_{yi}-y_i\ f_{xi}$. In various exemplary embodiments, the same holds for individual air jets 350, except that each air jet 350 delivers only either an x-force or a y-force. The total x-force $F_x$, y-force $F_y$, and z-torque $T_z$ acting on the object 360 are determined according to the following linear summation model:

$$F_x = \sum_{i=1}^{N} f_{xi} \quad \text{Eq. (3)}$$

$$F_y = \sum_{i=1}^{N} f_{yi}$$

$$T_z = \sum_{i=1}^{N} x_i f_{yi} - \sum_{i=1}^{N} y_i f_{xi}$$

Figure 4:
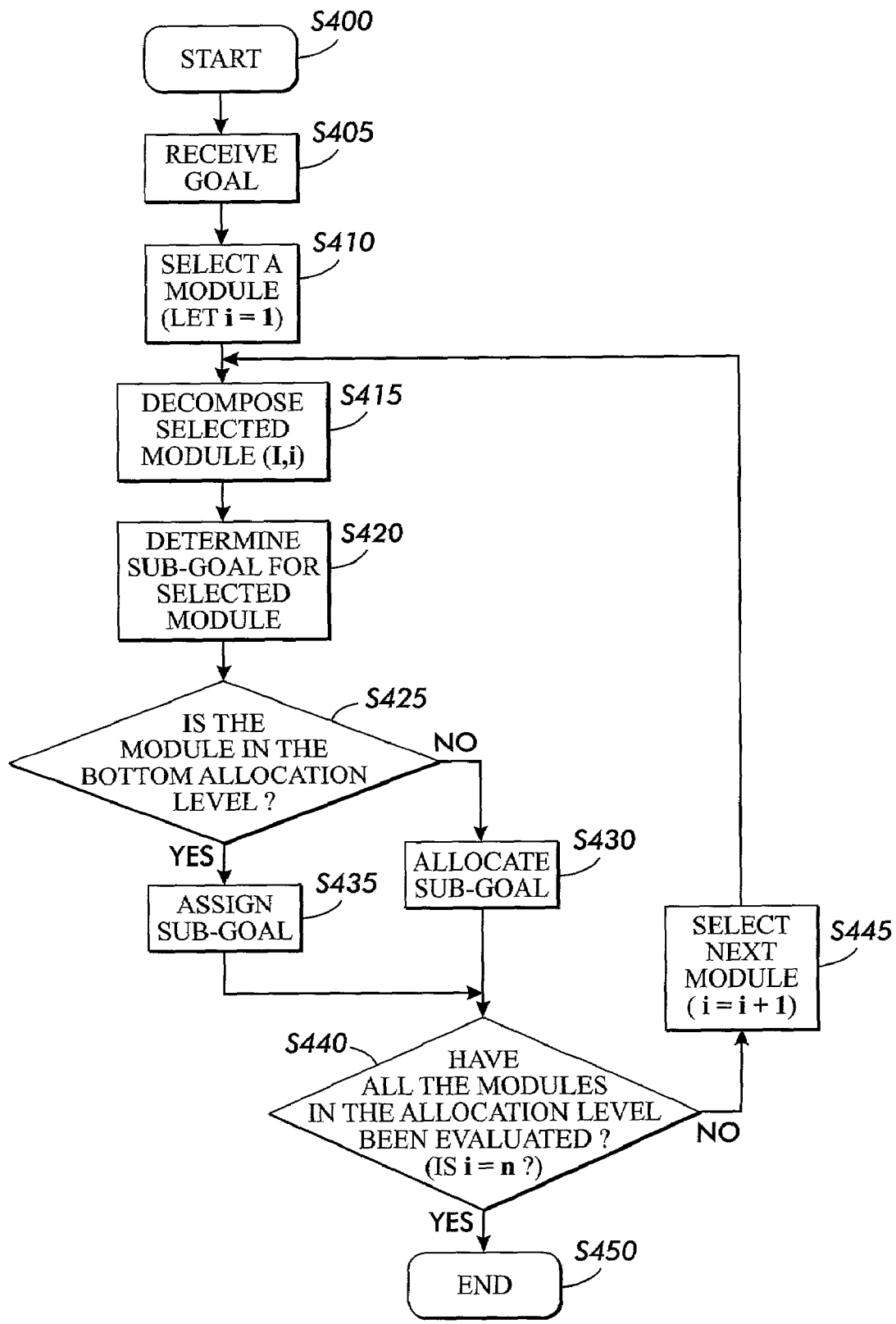
FIG. 4 is flow chart outlining an exemplary embodiment of a method for allocating an overall objective for a smart matter system, according to this invention.

FIG. 4 displays one exemplary embodiment of a method of hierarchically allocating a force for a many actuator system, in accordance with the present invention. In various exemplary embodiments, this method is employed by an allocator within a many actuator system. In other various exemplary embodiments, this method is employed by a plurality of level allocators within a many actuator system.

Because the number of actuators greatly exceeds the dimensionality of a control command (desired goal) U, wherein $U=(F_x\ F_y\ T_z)$, there are many ways of assigning the actuation to the actuators. In general, it is desirable to use the additional degrees of freedom to attain other desirable goals and thus select the most desirable allocation out of many possible actuator configurations. In other words, the force allocation problem can be viewed as a constrained optimization problem, where the constraints are both the domain constraints of the actuators and the relations between individual actuators and the total delivered forces (Eq. (2) and Eq. (3)). This optimization problem is solved at each control time step in order to determine which actuators should be activated. Precise generation of the required action is not usually possible because the actuation is discrete. In general such a discrete optimization problem is NP-hard, i.e., actuation assignment computation scales exponentially with the number of actuators. On the other hand, for arrays of actuators having a large number of actuators, the actuation approaches a continuum limit, and the problem becomes easy to solve approximately. Therefore, a desirable property for a force allocation method is to solve the discrete optimization problem optimally for small numbers of jets, provide a near-optimal solution for intermediate numbers of jets, and approach the continuum for large numbers of jets, as is accomplished by the present invention.

In various exemplary embodiments for methods of allocating forces according to the present invention, an optimal assignment of actuation can be obtained by an exhaustive search, a discrete optimization solver, or a lookup table of precomputed solutions for a small number of actuators (e.g., equal to or less than 10 for the air jet example running with a loop time of 1 ms on a typical digital signal processor). In various exemplary embodiments for methods of allocating forces according to the present invention, the allocation problem is decomposed into smaller sub-problems in a near optimal manner using continuous solutions as approximations, for a large number of actuators (e.g. equal to or greater than 10 for the air jet example running with a loop time of 1 ms on a typical digital signal processor). In other various exemplary embodiments, each sub-problem may be further decomposed into yet smaller sub-problems, or, if sufficiently small, the sub-problem is solved optimally using conventional methods, such as, but not limited to, look-up tables.

In various exemplary embodiments of a method for allocating a force according to the present invention, decomposition into sub-problems includes dividing the actuators into modules (groups of actuators) and then assigning responsibility to produce a required force to each module.

The exemplary method shown in FIG. 4, begins in step S400 and proceeds to step S405, wherein the goal that needs to be allocated is received. In various exemplary embodiments, the goal is a force. A particular level controlled by either a system allocator or a module allocator is received. In various exemplary embodiments, the goal received is the overall goal that is received by the allocator 110 from the goal generation device 130. In other various exemplary embodiments, the goal received is a force allocation from an allocator 114 in the top level 116 received by an allocator 114 located within the middle level 117.

In various exemplary embodiments, the top level allocation is identified as Allocate(U, I, n), wherein: U represents the overall task for the entire array of actuators and is represented as $U=(F_x \ F_y \ T_z)^T$; I is an identifier string or list of numbers, which denotes the level of the system (the top level is level 1 and an I of "1.2" indicates module 2 in level 2 within the top level 1); the n denotes the number of modules or jets within this level (for the top level, n is 1).

In step S410, the first module is selected, i.e. i, which is an index representing modules within a level, is set to be equal to one. For the exemplary top level 116, shown in FIG. 1, there is only one allocator and thus only one module. Accordingly, that module is selected. For the exemplary middle level 117, shown in FIG. 1, there are two modules, each corresponding to an allocator 114. For the exemplary bottom level 118, shown in FIG. 1, there are four modules, each corresponding to an allocator 114.

The method proceeds to step S415, wherein the current module i is decomposed. To decompose a module, whether it is for the entire system, i.e. the top level, or for a sub level, such as the middle level, a decomposition function is used. In various exemplary embodiments, the decomposition function is represented as:

$$[n_i, r_i, w_i] = \text{Decompose}(I, i)$$

The decomposition process selects module i in level I and returns the number $n_i$ of actuators or submodules, submodule position $r_i=(x_i \ y_i)$, and weights $w_i$ for the allocation function, which are discussed further below. This decomposition function makes heuristic choices, which are discussed further below, for hierarchical decomposition of the module. If no (further) hierarchical decomposition is desired, i.e., it is not desired to split the current module into so-called sub-modules or subdomains, then this function decomposes module i into its $n_i$ actual jets, as would be done, for example, with the modules within the bottom level 118 of FIG. 1. The grouping of the plurality of actuators into actuator modules may be predetermined or computed dynamically based on, for example, a load-balancing criterion.

Figure 5:
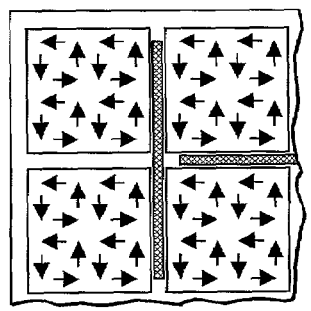
FIG. 5 is a schematic of an exemplary embodiment of a physical heuristic grouping of an array of actuators, according to this invention.

A plurality of actuators may be grouped into actuator modules in varying ways. In various exemplary embodiments, the physical layout of the plurality of actuators is followed, e.g., each cluster of actuators between the sensors becomes a module. An exemplary embodiment of a physical heuristic decomposition of an array of actuators is shown in FIG. 5 (i.e. "tiles"). The advantage of a physical heuristic is that a modular structure of the system leads to a corresponding modular structure of the allocation algorithm. In various exemplary embodiments, for an 8½ by 11 inch sheet of paper, which covers about 360 jets, the physical heuristic decomposes the area under the sheet into about 40 modules with up to about 16 actual jets in each module. A module entirely covered by the sheet contains 16 actual jets, with 4 jets for each direction. Even with discrete valves and a single-jet force of $f_{max}$, such a module provides near-continuous force domains for $f_{xi}$ and $f_{yi}$:

$$d_{xi} = d_{yi} = \{-4f_{max}, -3f_{max}, -2f_{max}, -f_{max}, 0, f_{max}, 2f_{max}, 3f_{max}, 4f_{max}\}$$

Figure 6:
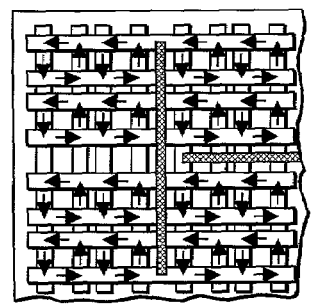
FIG. 6 is a schematic of an exemplary embodiment of a logical heuristic grouping of an array of actuators, according to this invention.

Another exemplary grouping heuristic is a "follow the constraints" or a logical heuristic. An exemplary embodiment of a logical heuristic grouping of the plurality of actuators is shown in FIG. 6. For example, all x jets with the same y position are interchangeable with respect to the constraints in Eq. (4) which is shown and explained below.

Rows of x jets with the same y position and columns of y jets with the same x position lead to particularly simple allocation functions within a row or column. In one exemplary embodiment, a decomposition of jets where the N modules are divided into $N_x$ "x modules," each with only x-directed jets with a common y position $y_i$, and $N_y$ "y modules," each with only y-directed jets with a common x position $x_i$, is shown in FIG. 4. With such an arrangement, the weighting features, $(w_{xi} \ w_{yi})=(n_{xi} \ 0)$ for an x module with $n_{xi}$ jets and $(0 \ n_{yi})$ for a y module containing $n_{yi}$ jets.

Grouping/decomposing at one level can greatly simplify the force allocation at another subordinate level. In various exemplary embodiments, for an 8½ by 11 inch sheet of paper, the logical heuristic groups the area under the sheet into about 50 modules, each with up to about 12 individual jets.

Referring again to FIG. 4, in step S420, the sub-goal is determined for the current module. In various exemplary embodiments, the sub-goal is a force. The sub-goal or force is represented as:

$$u_i = \text{Solve}(U, n_i, r_i, w_i, n)$$

where $U=(F_x \ F_y \ T_z)^T$ is the desired total force for all modules at the current level, n is the number of modules at the current level, all other inputs are those determined by the decomposition, and output $u_i=(f_{xi} \ f_{yi} \ t_{zi})^T$ is the computed allocation for module i. In various exemplary embodiments, U is the overall force generated by the goal generation device 130, for example. In other various exemplary embodiments, U is a force allocation instruction from a module from a level that is higher than the level of the current module. Depending on the level in the hierarchy or the number of submodules in the module, step S420 will use instantiations of Eqs. (5) and (6), which are shown and described below.

In step S425, it is determined whether the level that the current module is in is the bottom level of the entire array of actuators. The level is the bottom level if the module is not decomposed into further submodules. In other words, the current module does not allocate any forces to a module in a lower level, but rather the module will provide instructions to the actuators. If the current module level is not the bottom level, then the method proceeds to step S430, wherein the sub-goal is allocated to modules in the next lower level. This allocation is represented as Allocate ($u_i$, I.i, $n_i$). Otherwise, if in step S425 it is determined that the level that the current module is in is the bottom level, then the method proceeds to step S435, wherein the sub-goal, is assigned to individual actuators. An assignment function is represented as follows:

$$u_{fi} = \text{Assign}(u_i, I.i)$$

The assignment function assigns the desired actuation $u_{fi}$ to the actuators in module I.i. In other words, given desired actuation $u_i=(f_{xi} \ f_{yi} \ t_{zi})^T$ and a single actuator, the assignment function may choose $f_{xi}$ for an x jet and $f_{yi}$ for a y jet. For discrete domains, assignment may also apply a thresholding function to choose an element from the domain. For example, for an x jet with domain $\{0, f_{max}\}$, Assign may return $f_{max}$ if $f_{xi}$ is greater than $f_{max}/2$ and 0 otherwise. For a module with multiple jets, the assignment process may perform an optimal search. Since allocation is local to a module, it is also possible to precompute optimal assignments and reduce a force assignment to a lookup operation.

The following methods of generating an optimal allocation and assignment of a desired force U given a number of modules (consisting of groups of actuators or single actuators) are used for steps S430 and S435. In various exemplary embodiments, there are N modules with air jets in x and y directions. Each module is located at a position $(x_i,y_i)$ (i= 1, ..., N) relative to the center of mass of the object, i.e., the module applies its force at position $(x_i,y_i)$. In various exemplary embodiments, the jets should not work against each other while producing U (i.e., actuation should be minimal). Hence, a possible constrained optimization problem capturing such desired behavior is:

$$\underset{f_{xi}, f_{yi}}{\text{minimize}} \quad \frac{1}{2}\sum_{i=1}^{N}\frac{f_{xi}^2}{w_{xi}^2} + \frac{1}{2}\sum_{i=1}^{N}\frac{f_{yi}^2}{w_{yi}^2} \qquad \text{Eq. (4)}$$

$$\text{subject to} \quad F_x = \sum_{i=1}^{N} f_{xi}, \; F_y = \sum_{i=1}^{N} f_{yi}, \; T_z = \sum_{i=1}^{N} x_i f_{yi} - \sum_{i=1}^{N} y_i f_{xi}$$

where $f_i = (f_{xi}\; f_{yi})$ are the allocated x and y forces for module jet i, and $w_i = (w_{xi}\; w_{yi})$ are the weighting factors for each module's contribution to the x and y force. A large weighting factor causes the module to assume a greater role in meeting the constraints for forces and torque and a smaller role in minimizing the objective function. A small factor emphasizes the objective function. This objective function causes each module to minimize its actuation, while still providing the forces needed by the control. If activation levels are continuous, the solution to this optimization problem is given by:

$$f_{xi} = w_{xi}\left(\frac{F_x}{\sum_{j=1}^{N} w_{xj}} + \frac{T_z - F_y \bar{x} + F_x \bar{y}}{\sigma_x^2 \sum_{j=1}^{N} w_{yj} + \sigma_y^2 \sum_{j=1}^{N} w_{xj}}(\bar{y} - y_i)\right) \qquad \text{Eq. (5)}$$

$$f_{yi} = w_{yi}\left(\frac{F_y}{\sum_{j=1}^{N} w_{yj}} - \frac{T_z - F_y \bar{x} + F_x \bar{y}}{\sigma_x^2 \sum_{j=1}^{N} w_{yj} + \sigma_y^2 \sum_{j=1}^{N} w_{xj}}(\bar{x} - x_i)\right)$$

$$t_{zi} = f_{yi}(x_i - x_i) - f_{xi}(y_i - y_i) = 0$$

for i=1, ..., N, where:

$$\bar{x} = \frac{\sum_{i=1}^{N} w_{yi} x_i}{\sum_{i=1}^{N} w_{yi}}, \; \bar{y} = \frac{\sum_{i=1}^{N} w_{xi} y_i}{\sum_{i=1}^{N} w_{xi}} \qquad \text{Eq. (6)}$$

$$\overline{x^2} = \frac{\sum_{i=1}^{N} w_{yi} x_i^2}{\sum_{i=1}^{N} w_{yi}}, \; \overline{y^2} = \frac{\sum_{i=1}^{N} w_{xi} y_i^2}{\sum_{i=1}^{N} w_{xi}}$$

$$\sigma_x^2 = \overline{x^2} - \bar{x}^2, \; \sigma_y^2 = \overline{y^2} - \bar{y}^2$$

The quantities $\bar{x}, \bar{y}$ are the weighted average position of all the submodules, and $\sigma_x, \sigma_y$ are the weighted standard deviations of all the x and y submodule jet positions about this average. The torque $t_{zi}$ is zero with respect to $(x_i, y_i)$.

These equations provide a continuous solution to the optimization problem. In various exemplary embodiments wherein the domains of the jets are continuous, these equations provide an optimal solution. When implemented with discrete actuators, the optimal solution is approximated with a hierarchical decomposition as the number of jets in each module becomes large (and thus has an almost continuous domain). The implementation with discrete actuators will be discussed below.

The overall forces required by Eqs. (5) and (6) represent a partitioning of the overall task $U=(F_x\; F_y\; T_z)^T$ for a large region into tasks $u_i=(f_{xi}\; f_{yi}\; 0)^T$ for its subregions or modules.

The solution in Eqs. (5) and (6) to the constrained optimization problem can be instantiated as needed for particular systems. For example, for non-hierarchical allocation to $N_x$ x jets and $N_y$ y jets, each jet "module" includes a single jet and is weighted equally by $(w_{xi}\; w_{yi})=(1\; 0)$ for an x jet and $(0\; 1)$ for a y jet. The instantiations of Eqs. 5 and 6 are easy to derive.

In a two-level hierarchical allocation, where the system is decomposed into modules consisting of individual jets, weights at the top level can be used to shift assignment of actuation depending on module sizes. For example, for the ith module with $n_{xi}$ x jets and $n_{yi}$ y jets, the weights may be selected to be $(w_{xi}\; w_{yi})=(n_{xi}\; n_{yi})$. Again, the instantiations of Eqs. 5 and 6 can be derived. Allocation within each module is akin to non-hierarchical allocation to the jets in the module, using the same equations.

For a module that is logically decomposed, allocation to the modules instantiating Eqs. (5) and (6) needs only to be computed for $f_{xi}$ or $f_{yi}$ for the x and y modules, respectively, and allocation within a module follows Eq. (7) for x modules and its equivalent for y modules. In various exemplary embodiments, if an array of air jets that has been decomposed by a logical heuristic consists only of N x jets with the same y position, the instantiation of the allocation function for the module, namely, Eq. (5), would be $$f_{xi} = \frac{F_x}{N}, \; f_{yi} = 0, \; t_{zi} = 0 \quad (i=1,\ldots,N) \qquad \text{Eq. (7)}$$

After steps S430 and S435, the method proceeds to step S440, wherein it is determined whether all of the modules have been evaluated, i.e. whether the forces for the modules have to be either further allocated or assigned to individual actuators. In other words, it is determined whether i is equal to n, wherein n equals the number of modules in the level. If i is not equal to n (i.e. all the modules have not been evaluated), the method proceeds to step S445.

In step S445, the next module is selected. In other words, i is increased to i+1. The method then proceeds back through steps S415 through S440, until i is equal to n, the number of modules or actuators within the level. In other words, each module in the level is decomposed, the force for each module is determined and the force for each module is either allocated to a submodule or assigned to individual actuators. If there are no further modules to select, then a next module cannot be selected and in step S440 it will be determined that all of the modules have been evaluated.

If in step S440, it is determined that all the modules have been evaluated, i.e., that i is equal to n, then the method proceeds to step S450, wherein the method ends.

The foregoing exemplary embodiment has the property that the allocation within one module does not depend on the allocation within any other module at the same level. In other words, allocations within modules at any given level are completely decoupled from each other and thus can be parallelized and distributed among multiple processors.

Furthermore, the distribution of computation is at the same scale as the actuation. This property is of obvious interest for many actuator systems with very large numbers of actuators.

In the foregoing exemplary embodiment, each call to allocate a force for a module partitions the actuation to the submodules of a given module. This exemplary embodiment is optimal for jets with continuous domains.

The foregoing exemplary embodiment recursively decomposes and allocates actuation to submodules within a module. In other various exemplary embodiments, the recursion terminates when at most $n_{max}$ jets remain in a module or the bottom level has been reached.

The foregoing exemplary embodiment is a recursive method. In other various exemplary embodiments, the method is implemented by an iterative method instead, as will be apparent to one skilled in the art.

In other various exemplary embodiments, the foregoing exemplary allocation method further includes allocating for error in step S430 that is generated during the force allocation of step S430 of a previous module. The error is the difference between the desired goal actuation for a given module and the actually produced actuation.

In one exemplary embodiment, the method of allocating the error is completed by a next module allocation method. The next module allocation method adds the force and torque errors made in allocating $u_{i-1}=(F_{i-1}'',T_{i-1}'')$ to the next module i to be allocated. In particular:

$$F_i^n =$$

$$F^{(n-1)}/N_n + \frac{(T^{(n-1)} - \bar{x}F^{(n-1)})}{N_n \sigma_x^2}(x_i - \bar{x}) + (1-W)\Delta T_{i-1}^{(n-1)}/x_i + W\Delta F_{i-1}^{(n-1)}.$$

where:
$\Delta T_{i-1}^{(n-1)}$
$\Delta F_{i-1}^{(n-1)}$ are the torque and force errors respectively made during allocation of the (i-1)th subdomain and W is an error weighting factor reflecting the relative importance of torque versus force errors. If W=1, then force errors are only to be considered, while W=0 ignores the force errors and considers only torque errors. The ith module attempts to correct for the error made during the earlier allocations. Similarly, when all the child modules/submodules have been allocated, the resulting error of the parent module is allocated to the next parent module who passes the error on to its children modules (i.e. its submodules). The order of considering the modules can be important with this embodiment, as well as others. For example, error allocation could be sequential or to a nearest neighbor. In various exemplary embodiments, an allocation from the rim of the object (sheet) to its center ("outside-in") is preferred. With an outside-in allocation, the outer most modules are allocated first. The error generated from this allocation is then allocated to the next outer most modules that are usually on the opposite side of the object. This process is continued until the center module is the last to be allocated. Outer modules apply the largest torques on the object. Any errors made by the outer modules tend to cancel each other out, leaving smaller errors to be dealt with by the inner modules that can deliver smaller torques.

Figure 7:
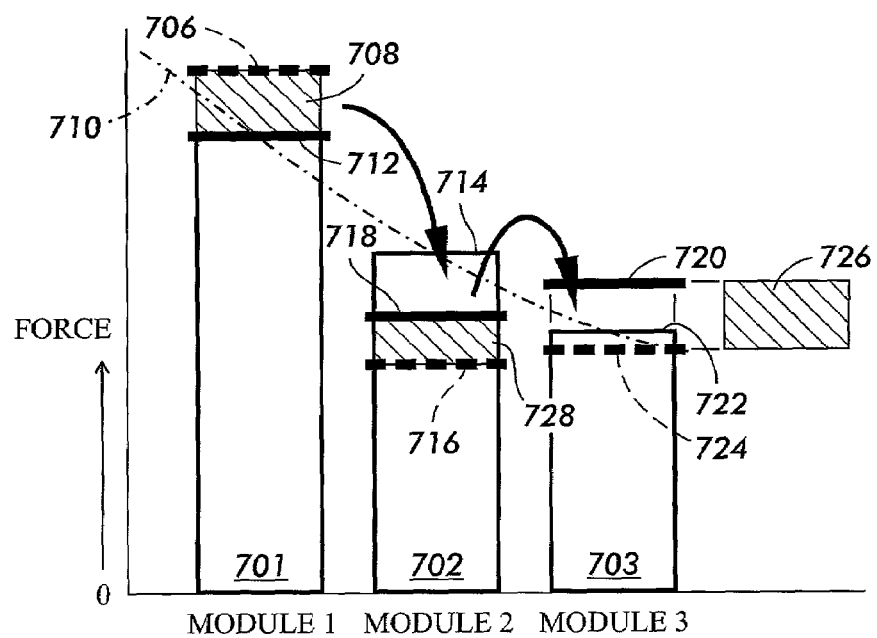
FIG. 7 is a chart displaying a method of error allocation throughout a plurality of subdomains according to one exemplary embodiment of the present invention.

In another exemplary embodiment, the error allocation method is a universal error allocation. In the universal error allocation method, the error generated is allocated to all of the remaining modules within the current level. This error allocation is accomplished by adjusting $T^{(n-1)}$ and $F^{(n-1)}$ by the error caused by allocation of the current module. The allocation of the next subdomain uses the new goals. FIG. 7 displays a chart that displays decomposition of a system into modules 701, 702, and 703 for modules 1, 2, and 3 respectively, to approximate a continuous force represented by dot-dashed curved line 710. Each module attempts to represent the average continuous force density within its boundaries. For module 1, this force is 712. The actual force delivered in this module is 706 denoted by the dashed line. The error therefore is given by the cross hatched square 708. The error 708 is subtracted from the average continuous force 714 to give the next desired force, 718, the thick line in module 2. The error 708 is subtracted from 714 because the delivered force was too large in module 1 compared to the desired force 712. The force delivered in module 2 is given by 716 (dashed line), which is too small compared to the total desired force 718 denoted by the thick line, giving an error for module 2 given by 728. This error 728 is added to the desired average continuous force 722 to given the desired module 3 force 720 (thick line). The actual delivered force in module 3 is 724 denoted by the dashed line. The error is therefore 726 for the combination of all three modules. The error scheme presented in FIG. 7 is just one of many. Another possibility includes assigning equal fractions of each module error to the others.

Because of the error allocation methods, according to the present invention, the local allocations of force do not have to be absolutely optimal; global allocation is important.

Experimental Results

Experimental results will now be discussed to evaluate the various alternative force allocation algorithms in terms of their efficiency and effectiveness. Of particular importance for systems with large numbers of actuators is the scaling of their execution times and force allocation errors with the number of actuators. One might expect that there is a trade-off between execution time and errors for the different force allocation algorithms.

For the following evaluations, a simplified system of air jets were used as actuators. The system consisted of y jets that together only deliver a y-force and a z-torque $U=[F_y, T_z]^T$. The number of positive and negative jets N under the sheet ranged from 1–100, the number of jets per module in hierarchical algorithms was 5, and the total combined maximum force was always $F_{max}=1$ (i.e., each jet delivered a force of 1/N). The jets were generalized discrete jets with domains $\{-1/N, 0, 1/N\}$ (i.e. possible actuation states).

There are two ways of decomposing this exemplary experimental system hierarchically, either by grouping jets that are next to each other into modules, or by defining modules as columns of multiple jets with the same x position. In either case, this simplified system is equivalent to controlling the angle and y-position of a sheet using columns of jets.

Figure 8:
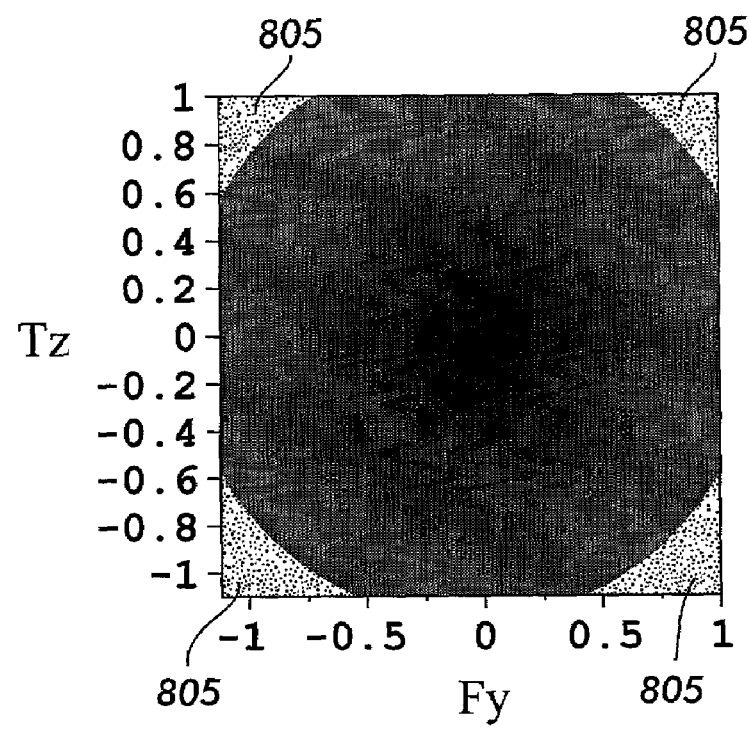
FIG. 8 is a chart showing a pictorial representation of a sample rms combined error over the grid for an optimal allocation algorithm.
Figure 9:
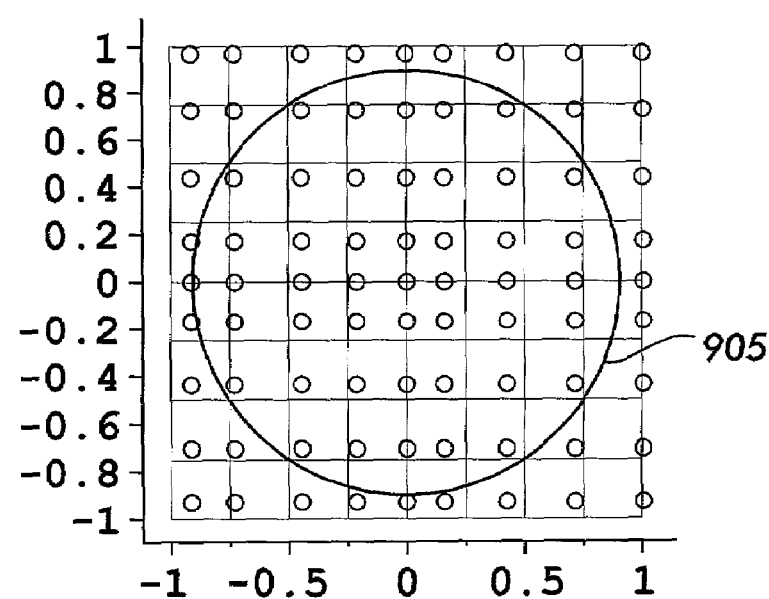
FIG. 9 is a chart showing a grid of evaluated force/torque points (within circle)

Each algorithm was evaluated on a two-dimensional grid of goal force and torque values to determine the execution time and average allocation error. The grid evaluation points range from −1 to 1 with step size 0.25 with a small pseudo-random value added to avoid symmetric cancellation. Time is the elapsed CPU time. All of the algorithms were implemented in Matlab 5.3 and computations for modules at the same level were simulated as running in parallel. The combined rms error σ for the desired goals $u_j=(F_{yi}\ T_{zi})$ and the allocated actuation $u_{a,i}=(F_{ya,i}\ T_{za,i})$ was calculated as $$\sigma=\sqrt{w_1\sigma_F^2+w_2\sigma_T^2}$$

where $w_1=w_2=0.5$, and $\sigma_F$ and $\sigma_T$ are the standard deviations of force error and torque errors computed over the grid or portions of the grid. FIGS. 8 and 9 show a task space of $F_y$ and $T_z$ grid with pseudo-random variations. FIG. 8 shows a pictorial representation of a sample rms combined error over the grid for an optimal algorithm. It shows that large force and torque values cannot be delivered together as represented by areas 805. Because these large, unavoidable errors dominate the rms error, the rms error was computed over a confined area of the grid, namely a circle 905 with range 90% of $F_{max}$, where an algorithm should be able to allocate with a small error as shown in FIG. 9 (which is a grid of evaluated force/torque points (within circle)).

In this evaluation, the four algorithms shown in Table 1 were compared. The four algorithms are: 1) optimal allocation using global search; 2) flat (non-hierarchical) allocation using Eqs. (5) and (6) in Solve and simple thresholding of the result in Assign; 3) two-level hierarchical allocation using Eqs. (5) and (6) in Solve at both levels; and 4) two-level hierarchical allocation using Eqs. (5) and (6) at the top level and optimal allocation at the lower level. Optimal allocation includes a brute-force search through all the possibilities for the allocation that minimizes the rms error.

TABLE 1

| Algorithms | Optimal | Heuristic |
|---|---|---|
| Flat | 1 (global) | 2 |
| Hierarchical | 4 (local) | 3 |

Figure 10:
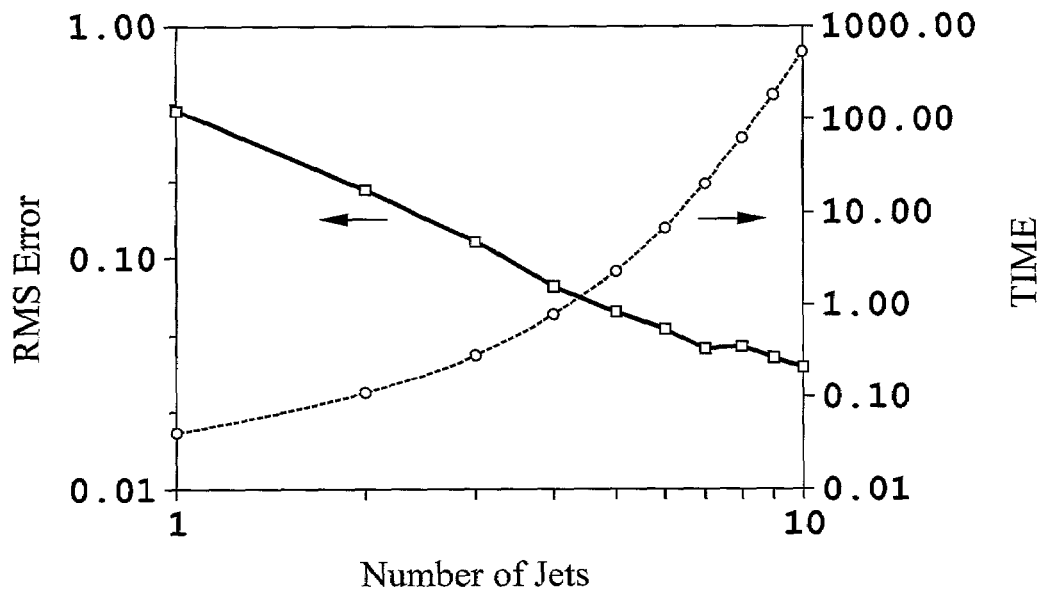
FIG. 10 is a chart showing the scaling of rms error and computation time for an optimal flat allocation algorithm.

Optimal allocation provides a baseline for the average allocation error. Because the execution time of the optimal algorithm scales so poorly with the number of jets, the optimal algorithm was evaluated only over the range of 1 to 10 jets. The results are shown in FIG. 10. The rms error is given by $0.4/N$ and computation time scales as $0.04\ 10^N$. These scaling results are readily understood because the truncation error for N jets with a force of $1/N$ each is a uniform distribution $\pm\frac{1}{2}N$. When this error is averaged over the force and torque grid, the result is roughly $\frac{1}{2}N\sqrt{2}$, which agrees with the observed value. While the error is small for optimal allocation, the exponential scaling for the computation time is unacceptable for systems with large numbers of actuators.

Figure 11:
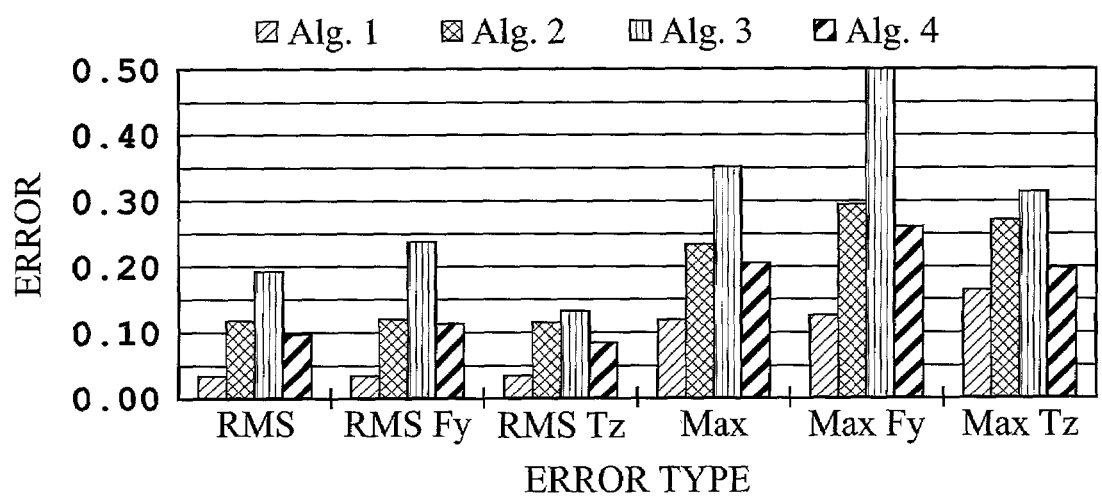
FIG. 11 is bar graph showing rms, maximum and individual errors for the central region of the force/torque grid for four different allocation algorithms.

FIG. 11 shows a comparison of the errors of the four algorithms in Table 1 for N=10 jets. As the figure shows, algorithm 4 (hierarchical allocation with optimal allocation within the module) yields the best results among the suboptimal algorithms. Flat allocation is next best, while hierarchical allocation without module optimization has the largest errors. Comparing the hierarchical algorithm with and without optimal allocation indicates that most of the error occurs by truncation when assigning within the module. Thus even for a small number of jets (e.g., less than 10), optimal allocation yields only about a factor of two improvement in error at a cost of 1 to 10 orders of magnitude in computation speed over the near-optimal allocation schemes. It is clear that near-optimal allocation is required for the more interesting ranges of 10–1000 jets.

Figure 12:
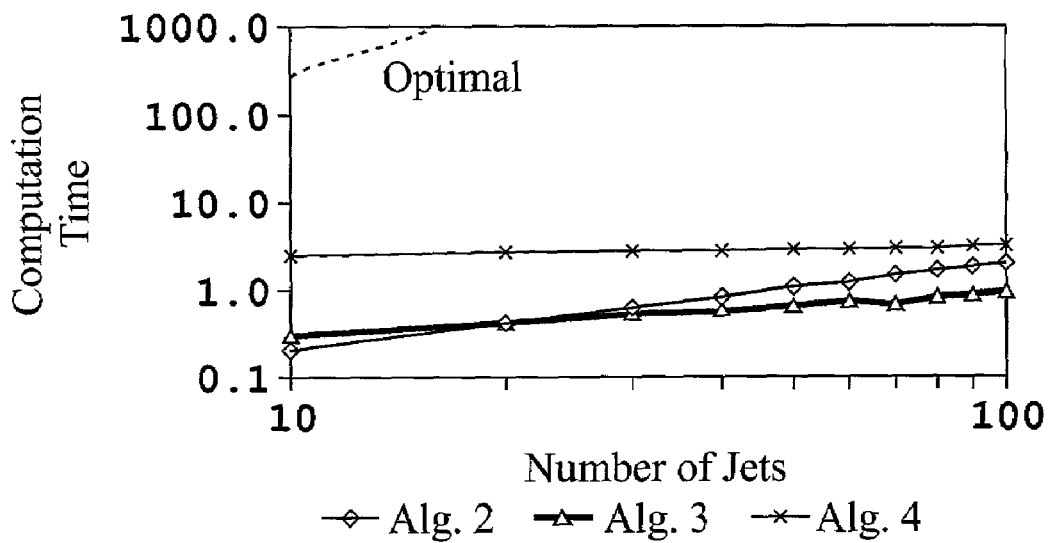
FIG. 12 is a chart showing the scaling of computation time of four different allocation algorithms.

The scaling of error and computation time as the number of jets ranges from 10 to 100 is now considered. While the optimal allocation cannot be computed, the scaling properties of the various near-optimal allocation algorithms can be compared and the scaling laws for the optimal allocation can be used. The computation times for the evaluated algorithms as a function of the number of jets is shown in FIG. 12. The hierarchical allocation algorithms exhibit a very slow increase with the number of jets compared with the optimal and flat algorithms, confirming the expectation that hierarchical allocations exhibit good scaling properties. The time of (suboptimal) flat allocation (Alg. 2 increases as N, a clear disadvantage when compared with hierarchical allocation. The constant penalty factor for algorithm 4 compared with algorithm 3 reflects the time required to compute an optimal allocation for a small number of jets. In fact, at N=10, the computation time is completely dominated by the optimal allocation. This computation penalty factor could be removed by using precomputed look-up tables for allocation at the module level, or by decomposing the system such that optimal allocation within a module becomes trivial. In the evaluated system, the latter can be achieved by aggregating modules from columns of y jets with the same x position, as indicated above.

Figure 13:
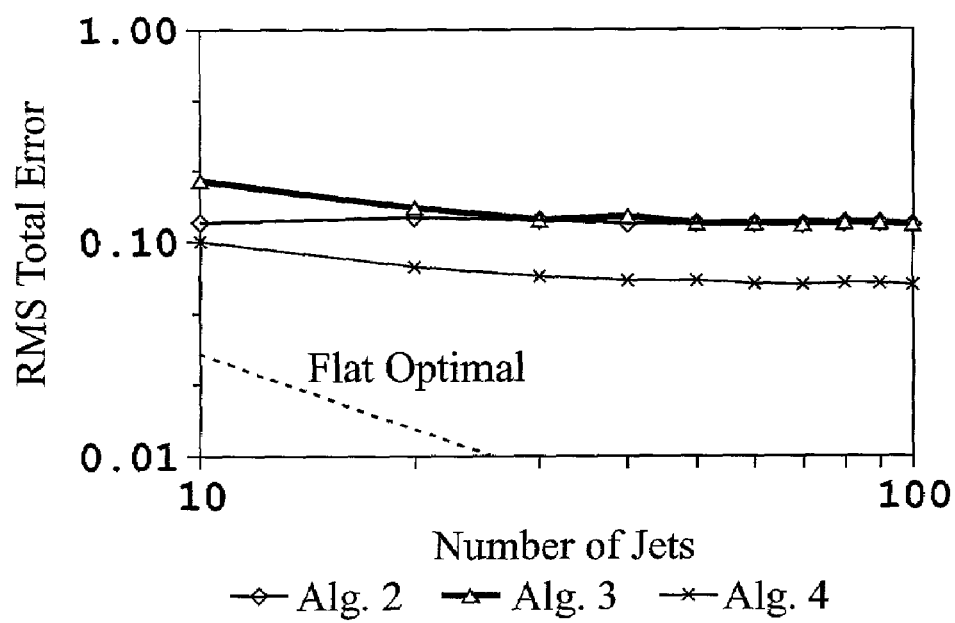
FIG. 13 is a chart showing the scaling of error of three different allocation algorithms.

The rms error for the evaluated algorithms as a function of the number of jets is shown in FIG. 13. As is evident, the error does not decrease significantly as the number of jets increases, even with optimal module allocation (algorithm 4). This behavior is a consequence of the fact that errors from individual module and jet allocations are not compensated by other allocations. More particularly, with a jet force of $1/N$ and optimal module allocation, each module makes an error of up to $\frac{1}{2}N$. With 5 jets per module, the number of modules is $M=N/5$, and thus the total force error can be as large as $M\ \frac{1}{2}=N/5\ \frac{1}{2}N=0.1$ independent of the number of jets. Because the maximum error tends to dominate the rms average, all the algorithms cluster near this value. Even with optimal module allocation, only the jets within a module are able to compensate for each other's error. However, from the maximum error formula $M\ \frac{1}{2}N$, It is apparent that if the number of modules M is kept constant as the number of jets N is increased (i.e., the number of jets per module is increased), the error scales roughly as $M\times\frac{1}{2}N$.

The experimental results presented above can be summarized as follows. There is a trade-off between error and computation time for the allocation problem for large numbers of actuators. Globally optimal allocation (algorithm 1), while producing the best errors, scales poorly with increasing numbers of jets. In fact, unless optimal allocation can be precomputed or computed easily (as in the row/column decomposition), the computational time scales as $2^N$ for N jets. On the other hand, flat allocation (algorithm 2), or simply breaking the problem into modules that are not allocated optimally (algorithm 3), results in relatively large allocation errors. In fact, as shown above, the dominating rms error is on the order of one half the maximum total force.

The best compromise is a hierarchical decomposition into modules with optimal allocation within a module (algorithm 4). Given a scaling of the error as M/N as shown above, the larger the module for which the optimal allocation can be computed in real-time, or precomputed and stored, and thus the smaller the number of modules M, the better the result.

At the same time, given N/M jets per module, the optimal allocation time per module scales with $2^{N/M}$, which suggests a trade-off between module size and number of modules for a particular N in order to decrease error while keeping computation time within acceptable bounds. The relation between error and computation time for all the algorithms, optimal, flat, and hierarchical, can be summarized with the relation $$\log(T) \times E \propto 1 \qquad (8)$$

where T is the computation time and E is the fractional error, the error as a fraction of the full range. This relationship applies for problems where, given a local minimum, a lower minimum can be found almost anywhere and is only weak correlated with the previous minimum, and/or where the algorithm does little better than chance to go from one local minimum to finding the next. This appears to be the case for the combined optimization of force and torque from discrete jets.

However, if the algorithm can find better near-optimal solutions determined in constant time (i.e., precomputed or computed trivially as in the row/column decomposition), and if module allocation can be distributed, then even superlinear scaling can be achieved, as computation time is dominated by the allocation to M modules at the top level.

These results are summarized in Table 2. Note that, for hierarchical algorithms, the computation time is the sum of computation times at the top and module levels. Assuming P processors available for module allocation, the latter can further be divided by P (consider in particular the case where P=M, i.e., there is one processor per module). For reference, the communication load is included, which scales with the number of calls between the levels and to the actuators.

TABLE 2

| Algorithms | 1 | 2 | 3 | 4 | 4 (cto) |
|---|---|---|---|---|---|
| Rms error | $\frac{1}{2N}$ | $\frac{1}{2}$ | $\frac{1}{2}$ | $\frac{M}{2N}$ | $\frac{M}{2N}$ |
| Computation time | $2^N$ | N | $M + \frac{N}{P}$ | $M + \frac{M2^{\frac{N}{M}}}{P}$ | $M + \frac{M}{P}$ |
| Communication load | N | N | M + N | M + N | M + N |

Table 2 shows scaling laws of error, computation time, and communication time for the algorithms that were evaluated, as well as for algorithm 4 with a constant-time module optimization (cto). The communication load is the number of messages passed between computational nodes and from computational nodes to the actuators.

The hybrid hierarchical-optimal algorithms presented work well for all ranges of numbers of actuators. For small numbers of actuators, the upper-level continuous allocation can be allocated trivially to a small number or even one module. The jets within a module are assigned optimally. For very large numbers of actuators (e.g., >1000), the number of jets within a module can be large, so the continuous allocation (which is optimal in the continuum limit) works very well. The lower level optimal allocation can be done either recursively to lower levels of modules or—because of the large numbers—through crude but rapid assignment. The algorithm works well in the medium range of 10<N<1000 as well. The asymptotic optimality of the continuum solution is used to guide the optimization to near-optimal smaller problems which are then solved using optimum methods. Thus, unlike other algorithms, this hybrid hiearchical optimal allocation works well in all regimes, and the system does not need to be redesigned as the number of actuators varies for different applications.

The hybrid hierarchical allocation of the present invention has been applied to an actual micro-electrical-mechanical system (MEMS) and found to work well. An exemplary embodiment of the present invention performs the allocation in<0.4 ms for row/column allocation on a single Analog Devices SHARC 40 MHz DSP using algorithm 4 with constant time optimal allocation at the lower level. An 8½ by 11 inch sheet in an exemplary embodiment of the present invention covers about N=360 jets, and row/column decomposition results in about M=40 to 50 modules with an average of 7 to 9 jets per module and a maximum of about 12 jets per module (depending on sheet position). The available jet force $f_{max}$ is about 0.1 mNt per jet. The average error is M/2 $f_{max}$=20 to 25 times $f_{max}$, and the time is 40 to 50 times a computation for a module allocation, which is dominated by maintaining the data structures. The resulting position error has been 30 μm rms and $10^{-5}$ radian rms angle error.

This is a tradeoff between the error and the computation time for methods of actuator allocation. Basically the log of the computation times the error is constant for hierarchical, optimal allocation, and hybrid-optimal hierarchical algorithms. Thus, a small decrease in error requires a large increase in computation time. However, because the allocation calculation is performed repetitively, this computational effort can be precomputed once. Thus, the hybrid hierarchical optimal allocation scheme had the best tradeoff between error and computation time.

The hybrid hierarchical-optimal algorithms of the present invention work well for all numbers of actuators from small traditional systems to many actuator systems conceived with thousands of actuators. These hybrid algorithms represent a general approach to high-dimensional problems. In other words, exemplary embodiments of the present invention use a continuous solution to break the problem up into a number of smaller self-similar problems that can either be further reduced in size or solved using optimal solutions. This present invention also has general application in other many degree of freedom systems such as robotic systems, such as, but not limited to, temperature-sensitive micro-robots (i.e. "smart dust"), and large-scale factories.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A distributed actuation allocation system, comprising:
    a plurality of implementation units grouped into a plurality of modules comprising at least one of the plurality of implementation units or a plurality of implementation unit sub-modules, wherein each of the plurality of implementation unit sub-modules includes at least one of the plurality of implementation units;
    a controller that generates a system goal; and
    at least one allocator that receives the system goal, partitions the system goal into a plurality of sub-goals, one for each of the plurality of modules, based on an allocation parameter, wherein the at least one allocator allocates at least one sub-goal to at least one of the plurality of sub-modules if the corresponding module includes a plurality of sub-modules, and the at least one allocator actuates the at least one of the plurality of implementation units within the at least one sub-module based on the sub-goal if the corresponding module does not include the plurality of sub-modules.

2. The system, as recited in claim 1, further comprising:
at least one sensor that detects an implementation state of at least one of the plurality of implementation units and provides the controller with the implementation state,
wherein the controller generates the system goal based on the implementation state.

3. The system, as recited in claim 1, wherein at least one of the plurality of implementation units is an air jet.

4. The system as recited in claim 1, further comprising:
an input source that provides system objective to the controller,
wherein the controller generates the system goal based on the system objective signal.

5. The system, as recited in claim 4, wherein the input source is a computer.

6. The system, as recited in claim 1, wherein the controller is remotely located from the plurality of actuators.

7. The system, as recited in claim 1, further comprising:
at least one sensor that detects an implementation state of at least one of the plurality of implementation units and provides the controller with the implementation state; and
an input source that provides an input signal to the controller,
wherein the controller generates the system goal based on the implementation state and the input signal.

8. The system, as recited in claim 1, wherein the allocation parameter is predefined.

9. The system, as recited in claim 1, wherein the allocation parameter is identity of the plurality of implementation modules under the control of the allocator.

10. The system, as recited in claim 1, wherein the allocator partitions the system goal into the plurality of sub-goals based on the allocation parameter and a second allocation parameter,
wherein the second allocation parameter is a location identifier for at least one of:
the plurality of implementation units, and
the implementation modules.

11. The system, as recited in claim 1, wherein the allocator partitions the system goal into the plurality of sub-goals based on the allocation parameter, a second allocation parameter and a third allocation parameter,
wherein the second allocation parameter is a location identifier and the third allocation parameter is a weighting factor for at least one of:
the plurality of implementation units, and
the implementation modules.

12. The system, as recited in claim 1, wherein the allocator further includes a plurality of hierarchical allocation levels each of which include at least one module allocator that allocate the sub-goals.

13. The system, as recited in claim 1, wherein at least one sub-module includes a plurality of second sub-modules, and the at least one allocator:
partitions at least one sub-goal into a plurality of second sub-goals, one for each of the second sub-modules,
determines if the sub-modules include at least one second sub-module,
allocates one of the second sub-goals to each of the sub-modules determined to include the at least one second sub-module, and actuating at least one of the plurality of implementation units disposed within the sub-module based on the second sub-goals for each of the sub-modules determined not to include the at least one second sub-module.

14. A computer-implemented method for allocating a system instruction to a plurality of actuators, comprising:
grouping the plurality of actuators into a plurality of actuator modules comprising at least one of the plurality of actuators or a plurality of actuator sub-modules, wherein each of the plurality of actuator sub-modules includes at least one of the plurality of actuators;
partitioning the system instruction into a plurality of sub-instructions, one for each of the plurality of actuator modules, based on at least one allocation parameter;
allocating each of the plurality of sub-instructions to at least one of the plurality of actuator sub-modules if the corresponding actuator module includes the plurality of actuator sub-modules; and
actuating the at least one of the plurality of actuators within the at least one actuator sub-module based on the sub-instructions, if the corresponding actuator module does not include the plurality of actuator sub-modules.

15. The method, as recited in claim 14, wherein the grouping step is based on a physical layout of the plurality of actuators.

16. The method, as recited in claim 14, wherein the allocation parameter includes at least one of:
the number of the plurality of actuator sub-modules; and
the number of the plurality of actuator modules.

17. A method for allocating a system instruction to a plurality of actuators, comprising:
grouping the plurality of actuators into a plurality of actuator modules comprising at least one of the plurality of actuators or a plurality of actuator sub-modules, wherein each of the plurality of actuator sub-modules includes at least one of the plurality of actuators;
partitioning the system instruction into a plurality of sub-instructions for each of the plurality of actuator modules based on at least one allocation parameter;
allocating each of the plurality of sub-instructions to at least one of the plurality of actuator sub-modules if the corresponding actuator module includes the plurality of actuator sub-modules; and
actuating the at least one of the plurality of actuators within the at least one actuator sub-module based on the sub-instructions, if the corresponding actuator module does not include the plurality of actuator sub-modules,
further comprising:
partitioning each of the plurality of sub-instructions into a plurality of second sub-instructions for each of the actuator sub-modules;
determining if each of the plurality of actuator sub-modules includes at least one second actuator sub-module;
allocating each of the plurality of second sub-instructions to the least one second actuator sub-module for each of the actuator sub-modules determined to include the at least one second actuator sub-module; and
actuating at least one of the plurality of actuators disposed within the sub-module based on the second sub-instructions for each of the actuator sub-modules determined not to include the at least one second actuator sub-module.

* * * * *